(12) United States Patent  (10) Patent No.: US 7,987,969 B2
Detmers et al.  (45) Date of Patent: Aug. 2, 2011

(54) SHEET-PROCESSING ASSEMBLY HAVING AN APPARATUS FOR TRANSPORTING A PALLET, PALLET CONVEYING SYSTEM AND SHEET-FED ROTARY PRINTING PRESS

(75) Inventors: Andreas Detmers, Heddesheim (DE); Georg Schmitt, Kirchheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 115 days.

(21) Appl. No.: 12/364,740

(22) Filed: Feb. 3, 2009

(65) Prior Publication Data

US 2009/0194940 A1   Aug. 6, 2009

(30) Foreign Application Priority Data

Feb. 4, 2008   (DE) .......................... 10 2008 007 613

(51) Int. Cl.
*B65G 13/02* (2006.01)
(52) U.S. Cl. ...................... 198/780; 193/35 R
(58) Field of Classification Search .................. 198/780; 193/35 R; 108/57.15; 414/927, 928, 929
See application file for complete search history.

(56) References Cited

U.S. PATENT DOCUMENTS

| 3,178,053 | A | * | 4/1965 | Robinson ........................... 221/9 |
| 3,757,971 | A |   | 9/1973 | Frish |
| 5,257,895 | A |   | 11/1993 | vom Stein |
| 6,942,444 | B2 | * | 9/2005 | Schoenbeck ............... 414/788.1 |
| 7,255,226 | B2 | * | 8/2007 | Lawless et al. ............... 198/782 |

FOREIGN PATENT DOCUMENTS

| AT | 326559 B | 12/1975 |
| DE | 10122428 A1 | 2/2002 |
| EP | 1153745 A1 | 11/2001 |
| GB | 1359064 A | 7/1974 |

OTHER PUBLICATIONS

German Search Report dated Jul. 15, 2008.
European Search Report dated Mar. 16, 2009.

* cited by examiner

*Primary Examiner* — Jeremy Severson
(74) *Attorney, Agent, or Firm* — Laurence A. Greenberg; Werner H. Stemer; Ralph E. Locher

(57) ABSTRACT

A sheet-processing assembly includes an apparatus for transporting a pallet bearing a sheet stack and a transfer conveyor having a number of transport rollers disposed transversely to the direction of transport of the pallet and a receiving fixture for a load-bearing element for the pallet, for example a lift truck fork. The receiving fixture is aligned parallel to the transport rollers. A conveying system having a transfer conveyor and a sheet-fed rotary printing press having a conveying system, are also provided.

8 Claims, 4 Drawing Sheets

SHEET-PROCESSING ASSEMBLY HAVING AN APPARATUS FOR TRANSPORTING A PALLET, PALLET CONVEYING SYSTEM AND SHEET-FED ROTARY PRINTING PRESS

CROSS-REFERENCE TO RELATED APPLICATION

This application claims the priority, under 35 U.S.C. §119, of German Patent Application DE 10 2008 007 613.9, filed Feb. 4, 2008; the prior application is herewith incorporated by reference in its entirety.

BACKGROUND OF THE INVENTION

Field of the Invention

The invention relates to a sheet-processing assembly having an apparatus for transporting a pallet on which a sheet stack to be fed to a sheet-processing machine is disposed. The invention also relates to a conveying system and a sheet-fed rotary printing press.

Conveying systems which are provided for the delivery of sheet-processing machines, in particular printing presses, are formed, for example, of a plurality of roller systems disposed side by side, which together form a roller conveyor. A sheet stack intended for processing is disposed on a pallet, is placed onto the roller conveyor through the use of a lift truck and is subsequently fed to a feeder of a sheet-processing machine.

A conveying system of that type is known, for example, from German Published, Non-Prosecuted Patent Application DE 101 22 428 A1. That publication shows a sheet-processing machine having a sheet feeder and a conveying section, through the use of which a sheet stack disposed on a pallet can be fed laterally to the sheet feeder. The conveying section has, in addition to the feeder, a sheet stack prealignment station and a transfer conveyor. The transfer conveyor has a receiving fixture for load-bearing elements of the lift truck, which is disposed in the direction of transport of the pallet.

In the processing of sheet formats which are smaller than the pallet format, they must be disposed eccentrically on the pallet for subsequent configuration of the sheet stack. However, that measure leads to an unfavorable weight distribution of the stack on the pallet and, in the worst case, can lead to a tilting of the lift truck.

SUMMARY OF THE INVENTION

It is accordingly an object of the invention to provide a sheet-processing assembly having an apparatus for transporting a pallet, a pallet conveying system and a sheet-fed rotary printing press, which overcome the hereinafore-mentioned disadvantages of the heretofore-known devices of this general type and in which a transfer conveyor is provided that can be delivered transversely to a direction of transport of the pallet.

With the foregoing and other objects in view there is provided, in accordance with the invention, a sheet-processing assembly, comprising a sheet-processing machine including a transfer conveyor having a number of transport rollers disposed side by side, and at least one receiving fixture for a load-bearing element for a pallet. The receiving fixture is disposed in axial alignment of the transport rollers or parallel to the transport rollers. An apparatus for transporting the pallet supports or carries a sheet stack to be fed to the sheet-processing machine.

It is a particular advantage of the invention that the transfer conveyor has a receiving fixture for load-bearing elements supporting a pallet, for example a lift truck fork, wherein the receiving fixture is aligned transversely to the direction of the pallet transport section. As a result of this measure, sheet stacks of smaller format than the pallet supporting them can be safely received.

In this way, the sheet-processing machine can advantageously be operated with a standard pallet for all sheet formats.

In accordance with an advantageous embodiment of the invention, shortened rollers are disposed in the region of the receiving fixture. As a result of this measure, the pallet is well supported even in the region of the receiving fixture. Preferably, seven out of nine supporting feet of the pallet are constantly supported by the transport rollers of the transfer conveyor. All of the transport rollers of the transfer conveyor have a preferably common drive.

Other features which are considered as characteristic for the invention are set forth in the appended claims.

Although the invention is illustrated and described herein as embodied in a sheet-processing assembly having an apparatus for transporting a pallet, a pallet conveying system and a sheet-fed rotary printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
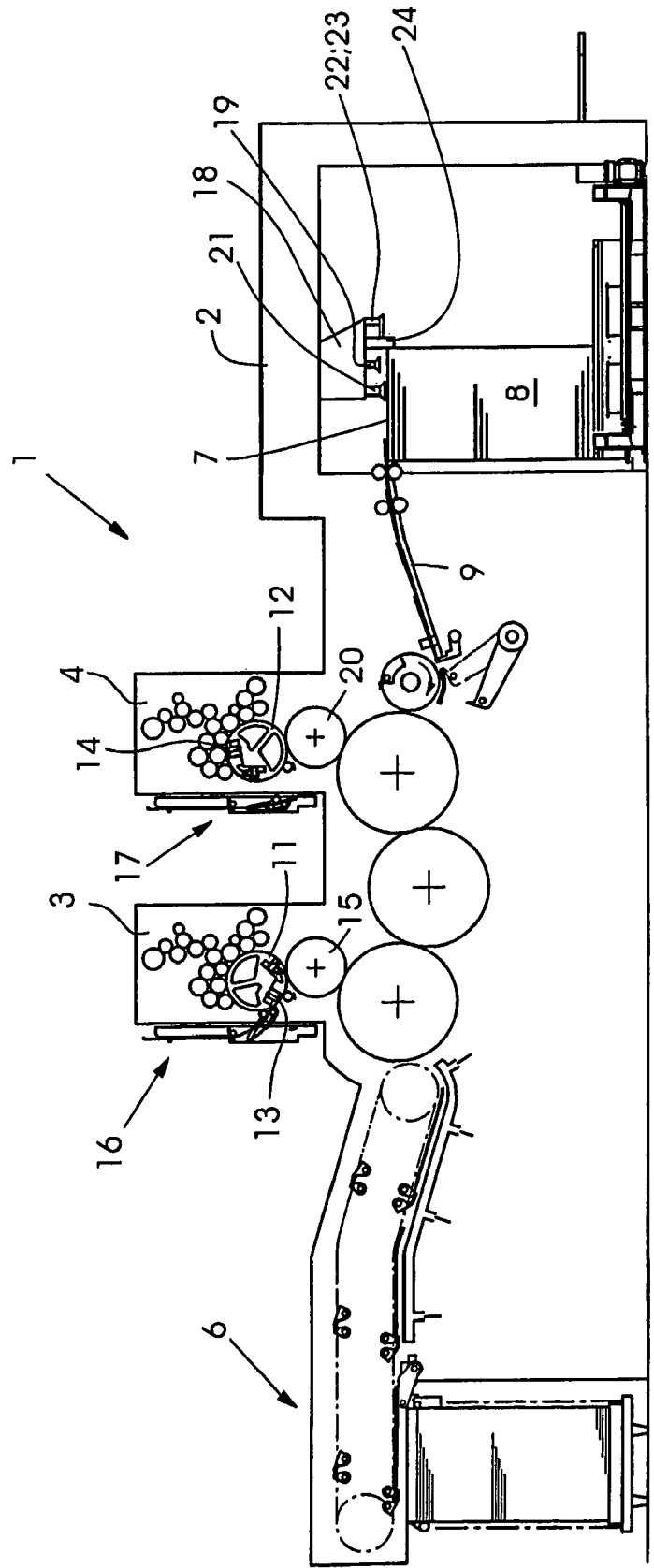
FIG. 1 is a diagrammatic, longitudinal-sectional view of a sheet-fed rotary printing press.

Referring now to the figures of the drawings in detail and first, particularly, to FIG. 1 thereof, there is seen a machine, for example a printing press 1, for the processing of sheets 7. The printing press 1 has a feeder 2, at least one printing unit 3, 4 and a sheet delivery 6. The sheets 7 are removed from a sheet stack 8 and are fed individually or in a stream, over a feed table 9, to the printing units 3 and 4. The printing units 3, 4 each contain a respective plate cylinder 11, 12 and thus respective interacting blanket cylinders 15, 20, in a known manner. The plate cylinders 11 and 12 each have a respective clamping device 13, 14 for the fastening of flexible printing plates. In addition, a device 16, 17 for semi-automatic or fully automatic printing plate changing is assigned to each plate cylinder 11, 12.

The sheet stack 8 rests on a stacking plate, which can be raised in a controlled manner. The sheets 7 are removed from the top side of the sheet stack 8 through the use of a so-called suction head 18 which, inter alia, has a number of lifting and dragging suckers 19, 21 for separating the sheets 7. In addition, blowers 22 for loosening upper sheet layers and sensing elements 23 for tracking the stack are provided. A number of lateral and rear stops 24 are provided for the alignment of the sheet stack 8, in particular of the upper sheets 7 of the sheet stack 8.

Figure 2:
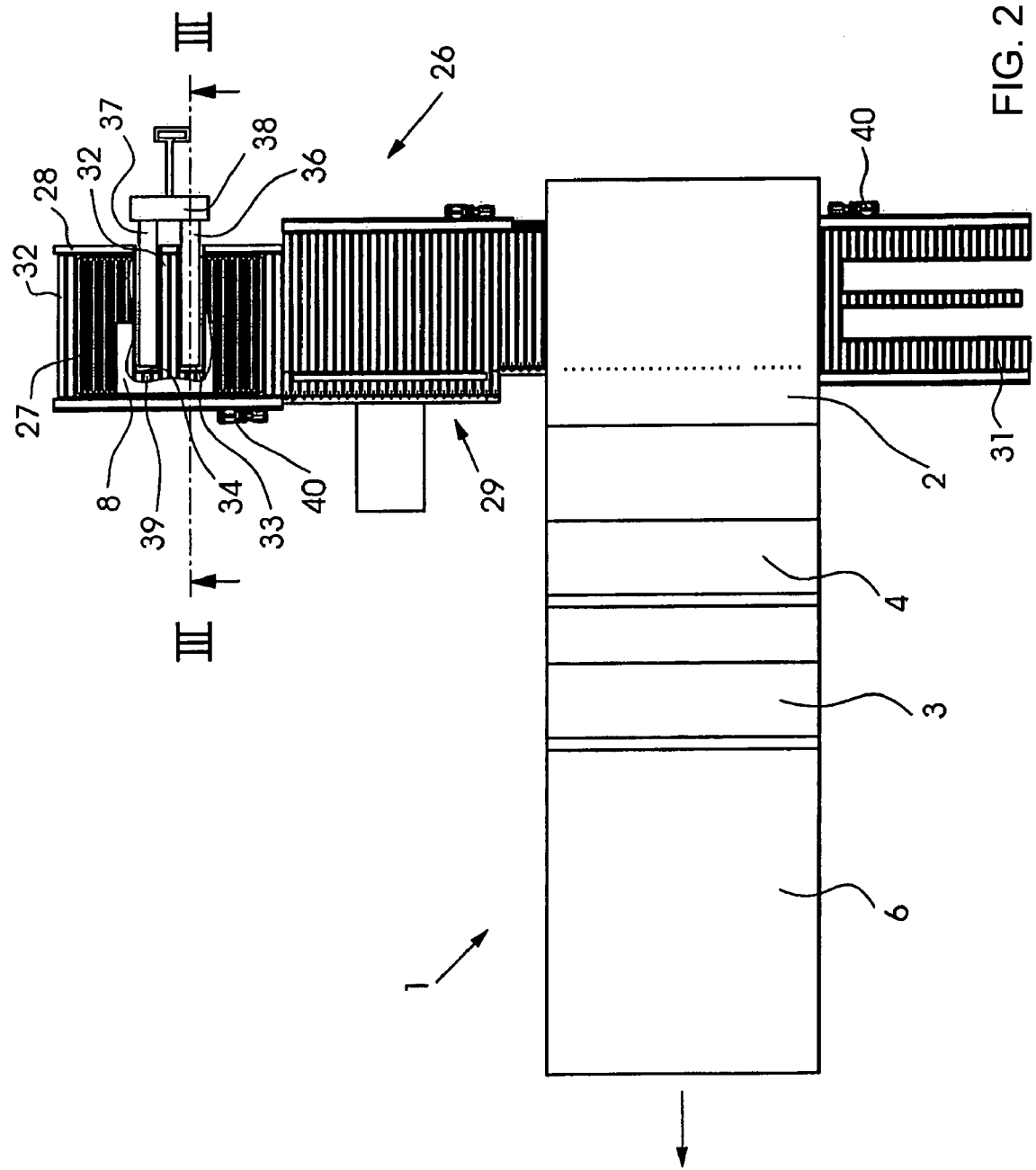
FIG. 2 is an enlarged, top-plan view of the printing press with a conveying system for sheet stacks.

As is seen in FIG. 2, a conveying system 26, which is assigned to the feeder 2, conveys pallets 27 to and from the stacking plate of the feeder 2. The conveying system 26 is disposed transversely to a sheet processing direction (arrow in FIG. 2) of the printing press 1 and is formed of a transfer conveyor 28, a sheet stack prealignment station 29 and a discharge element 31 for pallets 27, for example empty pallets.

The transfer conveyor 28 has a number of drivable transport rollers 32, which are disposed side by side and form a transport plane for the pallets 27. The transport rollers 32 are disposed in their axial alignment parallel to the sheet transport direction of the printing press 1 so that, for the pallets 27 and for the sheet stack 8 disposed on the pallet, a direction of transport is obtained which runs transversely to the sheet transport direction of the printing press 1. As a result of this measure, the sheet stacks 8 are fed laterally to the feeder 2.

A central region of the transfer conveyor 28 has a receiving fixture, preferably two parallel-disposed receiving fixtures 33, 34, pointing in the axial direction of the rollers 32, for load-bearing elements 36, 37, for example a lift truck fork of a lift truck or fork lift 38. Transport rollers 32, which are disposed between the receiving fixtures 33, 34, correspond to the rollers 32 disposed to the side of the receiving fixtures 33, 34. Shortened transport rollers 39 are respectively disposed in an extension of the receiving fixtures 33, 34.

Figure 3:
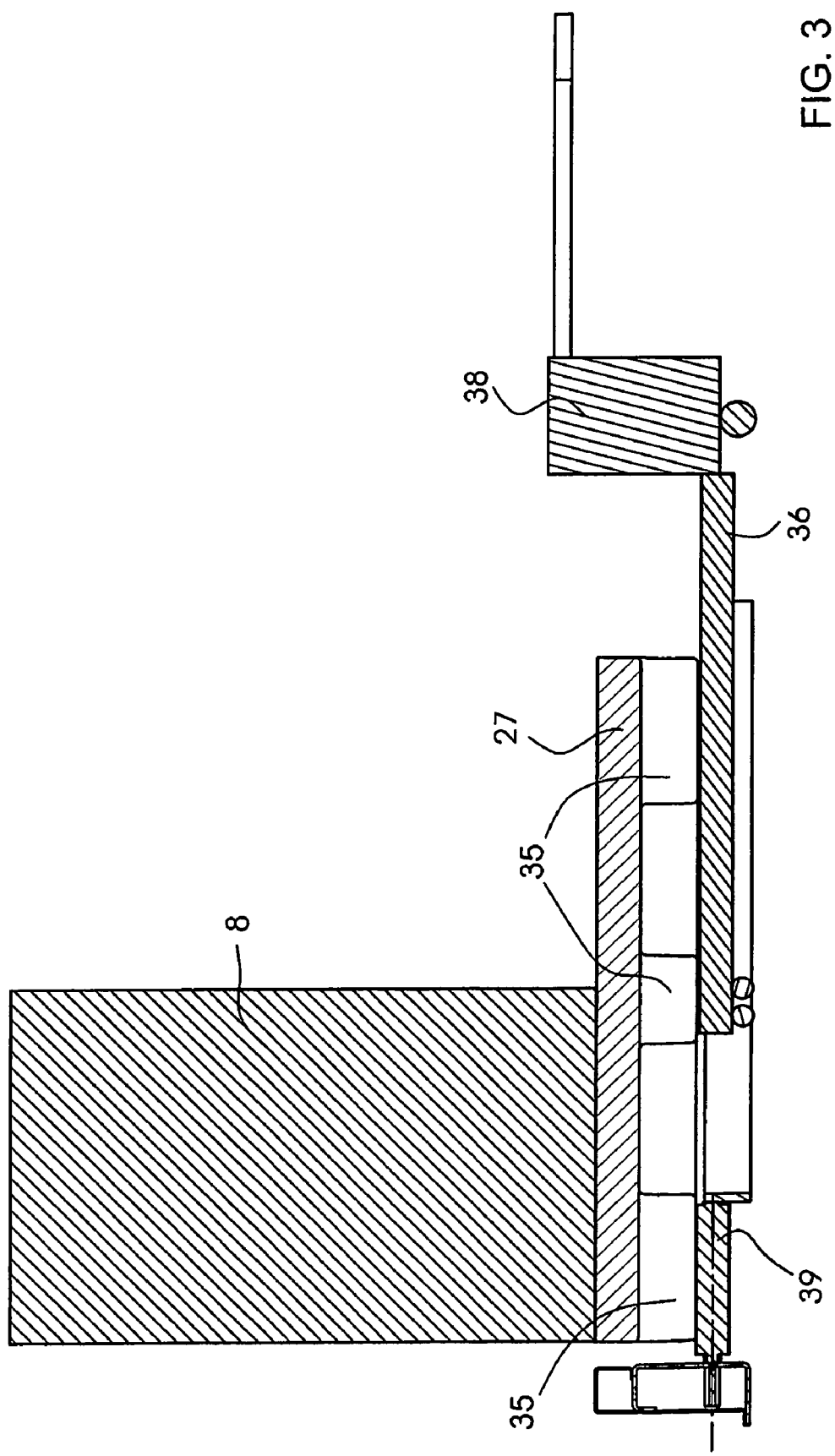
FIG. 3 is a cross-sectional view of a transfer conveyor with a pallet and a sheet stack.
Figure 5:
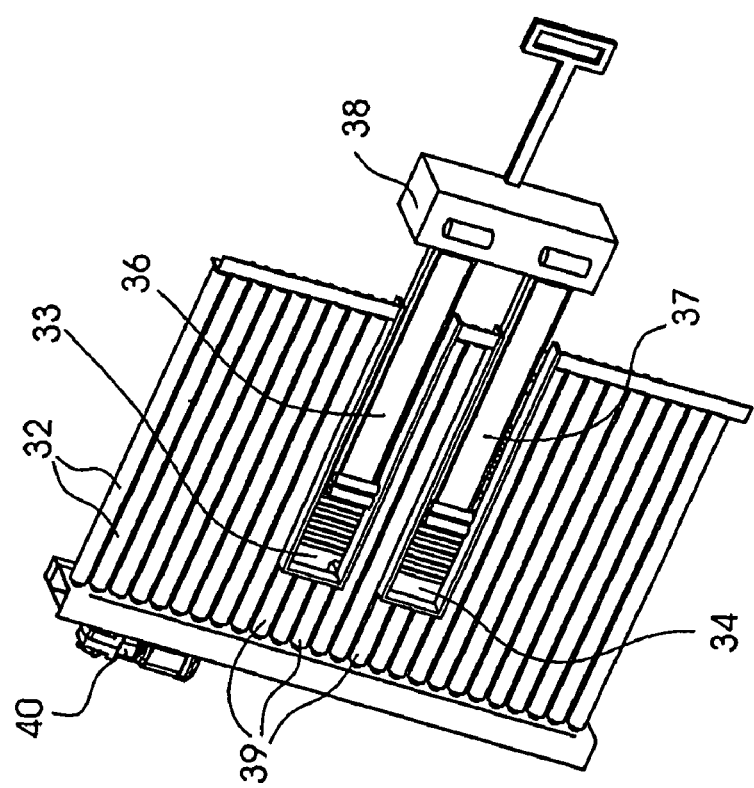
FIG. 5 is a bottom-perspective view of the transfer conveyor.
Figure 4:
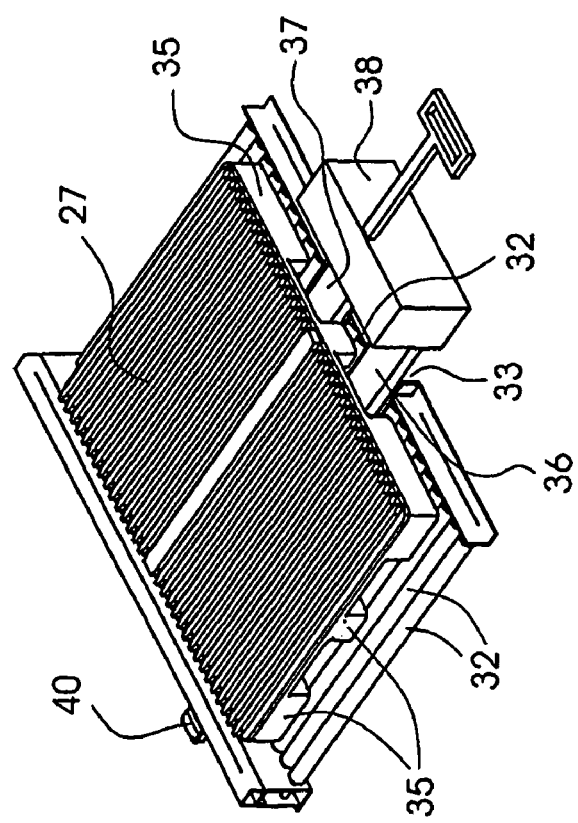
FIG. 4 is a top-perspective view of the transfer conveyor.

As is seen in FIGS. 3, 4 and 5, the pallets 27 to be processed preferably have nine supporting feet 35. When the pallet 27 is lowered onto the transfer conveyor 28, these supporting feet are supported by the transport rollers 32. During the transport of the pallet 27, two respective supporting feet 35 make their way into the region of the receiving fixtures 33, 34 and are not supported there. However, as a result of the configuration of the shortened transport rollers 39, at least seven supporting feet 35 of the pallet 27, are always supported.

All of the transport rollers 32, 39 have a preferably common drive 40.

The invention claimed is:

1. A sheet-processing assembly, comprising:
    a sheet-processing machine including a transfer conveyor having a number of transport rollers disposed side by side, and at least one receiving fixture for a load-bearing element for a pallet;
    said at least one receiving fixture being disposed in axial alignment of said transport rollers or parallel to said transport rollers and said at least one receiving fixture defining a region of extension;
    shortened transport rollers disposed in said region of extension of said at least one receiving fixture, said shortened transport rollers being shorter than said transport rollers of said sheet-processing machine; and
    an apparatus for transporting the pallet bearing a sheet stack to be fed to said sheet-processing machine.

2. The assembly according to claim 1, wherein said at least one receiving fixture is one of two mutually parallel receiving fixtures, and at least one further transport roller is disposed between said receiving fixtures.

3. The assembly according to claim 2, which further comprises a drive configured for driving all of said transport rollers.

4. The assembly according to claim 1, which further comprises a drive configured for driving all of said transport rollers.

5. A conveying system for transporting a pallet bearing a sheet stack for a sheet-processing machine, the conveying system comprising:
    a transfer conveyor having a number of transport rollers disposed side by side, and at least one receiving fixture for a load-bearing element for the pallet;
    said at least one receiving fixture being disposed in axial alignment of said transport rollers or parallel to said transport rollers and said at least one receiving fixture defining a region of extension; and
    shortened transport rollers disposed in said region of extension of said at least one receiving fixture, said shortened transport rollers being shorter than said transport rollers of said transfer conveyor.

6. The assembly according to claim 5, which further comprises a drive configured for driving all of said transport rollers.

7. A sheet-fed rotary printing press, comprising:
    a conveying system for transporting a pallet bearing a sheet stack;
    said conveying system including a pallet transfer conveyor having a number of transport rollers disposed side by side, and at least one receiving fixture for a load-bearing element for the pallet;
    said at least one receiving fixture being disposed in axial alignment of said transport rollers or parallel to said transport rollers and said at least one receiving fixture defining a region of extension; and
    shortened transport rollers disposed in said region of extension of said at least one receiving fixture, said shortened transport rollers being shorter than said transport rollers of said conveying system.

8. The assembly according to claim 7, which further comprises a drive configured for driving all of said transport rollers.

* * * * *